(No Model.)
J. CREIGHTON.
PULVERIZER ATTACHMENT FOR PLOWS.
No. 439,587. Patented Oct. 28, 1890.
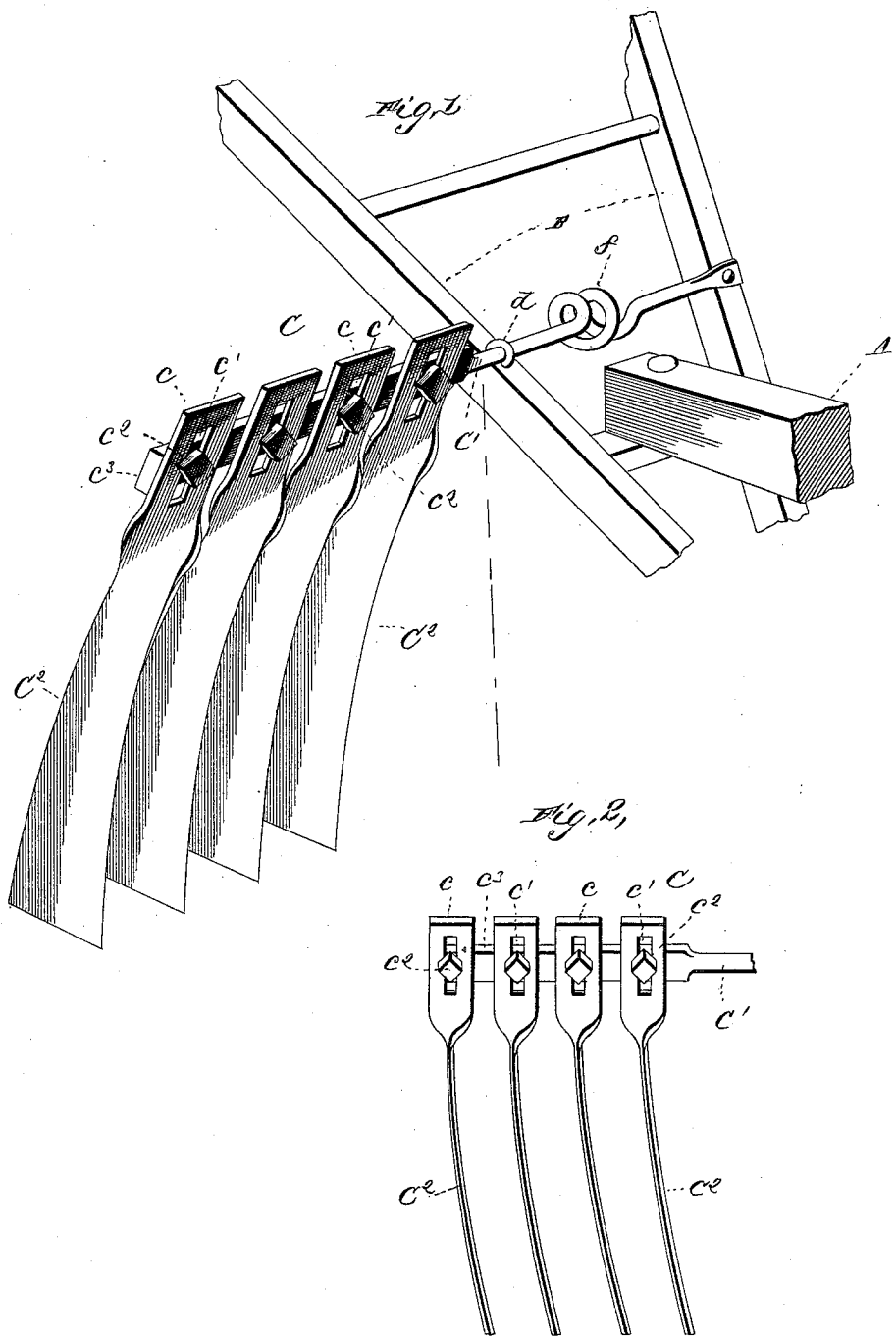
WITNESSES
INVENTOR
John Creighton,
by E.W. Anderson.
his Attorney

UNITED STATES PATENT OFFICE.

JOHN CREIGHTON, OF HARTFORD, OHIO, ASSIGNOR OF ONE-HALF TO CLINTON H. DRURY, OF SAME PLACE.

PULVERIZER ATTACHMENT FOR PLOWS.

SPECIFICATION forming part of Letters Patent No. 439,587, dated October 28, 1890.

Application filed July 19, 1890. Serial No. 359,272. (No model.)

*To all whom it may concern:*

Be it known that I, JOHN CREIGHTON, a citizen of the United States, and a resident of Hartford, in the county of Trumbull and State of Ohio, have invented certain new and useful Improvements in Pulverizer Attachments for Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a front view in perspective. Fig. 2 is a front view of the blades.

This invention relates to certain improvements in pulverizer attachments for plows; and it consists in the novel construction and combination of parts as hereinafter disclosed.

In the drawings, A refers to the beam, and B to the handles, of an ordinary plow.

C represents my pulverizer attachment consisting of the rod $C'$ and the series of laterally-curved blades $C^2$ for pulverizing the earth, said blades being disposed edgewise and obliquely to the ground, but having their shanks twisted into plate or flat portions $c$, standing at right angles to the plane of the blades. The shank $c$ of the blades $C^2$ are provided with longitudinal slots $c'$, receiving screw-bolts $c^2$, engaging a plate or bar-like portion $c^3$ of the rod $C'$ to permit the vertical adjustment of the blades, as circumstances may demand.

The rod $C'$ is of spring metal, and rests upon and transversely of the handles B at their conjunction with the beam, being bolted at one end to one handle and passing loosely through a staple or eyebolt $d$, secured to the other handle and having its plate or bar-like portion $c^3$ projecting beyond the latter at one side of the plow.

The rod $C'$ is formed with a number of coils intermediately of its bolted or secured end, and its plate or bar-like portion $c^3$ serving as a coiled spring $f$ to permit the blades or pulverizers $C^2$ to readily yield in event of contact with obstructions, thus preventing the breaking of the attachment.

It will be seen that by means of this attachment the blades pulverize or cut up the earth just as it is turned up by the plow and while yet moist or soft.

Having described this invention, what I claim, and desire to secure by Letters Patent, is—

1. The plow attachment provided with the series of laterally-curved blades having flat or plate-like shanks provided with vertical longitudinal slots, in combination with the rod having the plate or bar-like portion and screw-bolts connecting said blades to said bar-like portion of said rod, substantially as set forth.

2. The plow attachment consisting of the rod having one end secured to one handle of a plow and one portion passing loosely through a staple or keeper on the other handle and having a coiled-spring portion intermediately of its points of bearings on the handles, and the laterally-curved blades connected to the plate or bar-like portion of said rod, substantially as set forth.

In testimony whereof I affix my signature in presence of two witnesses.

JOHN CREIGHTON.

Witnesses:
LINEUS CREIGHTON,
C. H. DRURY.